(12) United States Patent
Crews et al.

(10) Patent No.: US 7,993,442 B2
(45) Date of Patent: Aug. 9, 2011

(54) METHOD FOR PRODUCING BITUMINOUS PAVING COMPOSITIONS

(75) Inventors: Everett Crews, Charleston, SC (US); Jonathan S. MacIver, Charleston, SC (US)

(73) Assignee: MeadWestvaco Corporation, Richmond, VA (US)

( * ) Notice: Subject to any disclaimer, the term of this patent is extended or adjusted under 35 U.S.C. 154(b) by 63 days.

(21) Appl. No.: 12/707,967

(22) Filed: Feb. 18, 2010

(65) Prior Publication Data

US 2010/0206196 A1 Aug. 19, 2010

Related U.S. Application Data

(60) Provisional application No. 61/153,673, filed on Feb. 19, 2009.

(51) Int. Cl.
*C08L 95/00* (2006.01)
*C09D 195/00* (2006.01)

(52) U.S. Cl. .......................................... 106/277; 524/60

(58) Field of Classification Search .................. 106/277; 524/60
See application file for complete search history.

(56) References Cited

U.S. PATENT DOCUMENTS

| | | | | | |
|---|---|---|---|---|---|
| 5,582,639 | A | * | 12/1996 | Hove | 106/281.1 |
| 5,743,950 | A | * | 4/1998 | Hendriks et al. | 106/281.1 |
| 6,106,604 | A | * | 8/2000 | Durand et al. | 106/277 |
| 7,297,204 | B2 | * | 11/2007 | Crews et al. | 106/277 |
| 7,510,606 | B2 | * | 3/2009 | Bourrel et al. | 106/277 |
| 7,767,015 | B2 | * | 8/2010 | Hurtado Aznar et al. | 106/277 |
| 7,833,338 | B2 | * | 11/2010 | Crews et al. | 106/277 |
| 7,905,949 | B2 | * | 3/2011 | Crews et al. | 106/277 |
| 7,951,857 | B2 | * | 5/2011 | Crews et al. | 524/60 |
| 7,951,858 | B2 | * | 5/2011 | Barreto et al. | 524/68 |
| 2007/0039520 | A1 | * | 2/2007 | Crews et al. | 106/316 |
| 2008/0060551 | A1 | * | 3/2008 | Crews et al. | 106/277 |

FOREIGN PATENT DOCUMENTS

GB 2255291 A * 11/1992
WO WO2008130789 A2 * 10/2008

* cited by examiner

*Primary Examiner* — Anthony Green
(74) *Attorney, Agent, or Firm* — MWV Intellectual Property Group

(57) ABSTRACT

A bituminous composition with improved paving performance, comprising a high-concentration-emulsifier bituminous emulsion is disclosed. The high-concentration-emulsifier bitumen emulsion has a higher content of surfactant than the conventional bitumen emulsion, thus facilitating the use of low levels of emulsion in the finished bituminous paving composition. Additionally, the high-concentration-emulsifier bitumen emulsion has superior surfactant dispersion property compared to the inverted bitumen dispersion, thereby enhancing the mixing and coating performance of the bituminous composition. The disclosed bituminous compositions may be used in a pavement construction at a much lower temperatures range compared to the conventional hot-mix bituminous composition, yet it develops adhesive strength and load-bearing strength properties at rates comparable to those of hot mix bituminous paving compositions.

28 Claims, No Drawings

METHOD FOR PRODUCING BITUMINOUS PAVING COMPOSITIONS

This non-provisional application relies on the filing date of provisional U.S. Application Ser. No. 61/153,673 filed on Feb. 19, 2009, having been filed within twelve (12) months thereof, which is incorporated herein by reference, and priority thereto is claimed under 35 USC §1.19(e).

BACKGROUND OF THE DISCLOSURE

To construct load-bearing asphalt pavements, hot mix bituminous paving compositions are most commonly used. Hot mix bituminous paving compositions consist principally of aggregate and bitumen binder. They are generally produced by mixing preheated aggregate and hot bitumen binder in either batch or continuous mixing equipment. Prior to mixing with the hot bitumen binder, the aggregate is heated to temperatures exceeding 150° C. to quantitatively remove both surface and pore-bound moisture. The bitumen binder is heated to temperatures typically exceeding 143° C. to lower the viscosity of the product and make it suitable for pumping through conventional liquid transfer equipment such as pumps. The resulting hot mix bituminous paving composition typically has a temperature exceeding 143° C. upon exiting the mixing equipment. This high-temperature bituminous paving composition is typically referred to by those skilled in the art as hot-mix asphalt ("HMA"). Elevated temperatures are needed in the production of HMA paving composition for two main reasons. First, high temperatures ensure complete removal of water from the aggregate. Wet aggregate cannot be coated by bitumen binder. Second, high temperatures ensure that the bitumen binder remains low in viscosity. Low bitumen binder viscosity enables the finished HMA to be workable throughout all the unit operations of mix production and pavement construction.

It is also known that oil-in-water bitumen emulsions and water-in-oil bitumen dispersions (inverted emulsions) may be used to produce bituminous paving compositions and construct load-bearing bituminous pavements at temperatures lower than those typical of the HMA process.

In U.S. Patent Publication Nos. 2007/039,520 and 2008/060,551, Crews et al. teach the production of bituminous paving compositions suitable for asphalt pavement construction through a process involving the mixing of a bitumen emulsion with aggregate at temperatures ranging from 60° C. to 140° C., wherein the oil-in-water bitumen emulsion comprises about 50-75% by weight of bitumen, about 0.05%-2.0% by weight of emulsifier, and about 25%-50% by weight of water. The bitumen emulsion is delivered to the worksite and mixed with aggregate in a high-temperature mixing equipment to produce bituminous paving composition. As such, the levels of water added to the high-temperature mixing equipment would exceed 1.0% by weight of the bituminous paving composition. This water is converted to steam in the mixing equipment, and this steam may cause fouling in the mixing process equipment such as filters and bag houses. Additionally, the steam may mix with airborne dust (produced during the mixing process) to form a mud-like barrier within the air filters of the plant exhaust equipment. The mud-like barrier restricts air flow through the exhaust equipment, thus causing a reduction of the mix production rate.

In U.S. Pat. No. 7,297,204, Crews et al. teach the production of bituminous paving compositions suitable for asphalt pavement construction through a process involving the mixing of an inverted bitumen emulsion with aggregate at temperatures ranging from 60° C. to 140° C., wherein the inverted bitumen emulsion comprises about 75-95% by weight of bitumen, about 0.05%-2.0% by weight of emulsifier, and about 5%-25% by weight of water. The inverted bitumen emulsion is delivered to the worksite and mixed with aggregate in a high-temperature mixing equipment to produce bituminous paving composition. The water in the bitumen inverted emulsion is converted to steam in the mixing equipment, which could foul the mixing process equipment and form a mud-like barrier that restricts air flow through the exhaust equipment.

Accordingly, there is a need for a process of producing bituminous paving compositions that are suitable for construction of load-bearing bituminous pavements at temperatures lower than those typical of the HMA process, wherein the production process minimizes the aforementioned problems caused by the water steam generated in the mixing operation upon mixing of aggregate with bitumen binder.

SUMMARY OF THE DISCLOSURE

The present disclosure relates to a process of producing bituminous paving compositions that are suitable for construction of load-bearing bituminous pavements at temperatures lower than those typical of the HMA process, wherein the production process minimizes the level of water steam generated during the mixing operation of aggregate and bitumen binder. The content of water present during the mixing operation is reduced to minimize the level of generated steam, while allowing for a simultaneous dispersion of the emulsifier with the bitumen. A bituminous paving composition with improved paving performance is produced by mixing aggregate, non-emulsified bitumen, and high-concentration-emulsifier bitumen emulsion. Herein, the phrase "high-concentration-emulsifier bitumen emulsion" refers to emulsions made with high concentrations of emulsifier by weight of the finished emulsion. The disclosed high-concentration-emulsifier bitumen emulsion has superior surfactant dispersion properties compared to conventional bitumen dispersions, thereby enhancing the mixing and coating of aggregate during production of the bituminous paving composition at temperatures ranging from 60° C. to 140° C. Additionally, the bitumen emulsions of the present disclosure contain high levels of emulsifier. As such, desired levels of surfactant may be delivered to the mixing operation without the concurrent addition of large amounts of water.

The disclosed bituminous composition may be used in pavement construction at a much lower temperatures range compared to the conventional hot-mix bituminous composition, yet it develops adhesive strength and load-bearing strength properties at rates comparable to those of the hot mix bituminous paving compositions.

DETAILED DESCRIPTION OF THE DISCLOSURE

The present disclosures now will be described more fully hereinafter, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements.

The terms "bitumen" or "bituminous" in the present disclosure refer to naturally-occurring bitumen and modified bitumen. They are also known as "asphalt." Examples of such materials suitable for use in the present disclosure include, but are not limited to, naturally occurring bitumen, bitumen derived from crude oil, petroleum pitch obtained from a cracking process, coal tar, polymer-modified bitumen, rubberized bitumen, rubberized bitumen containing recycled tire material, acid-modified bitumen, wax-modified bitumen, and combinations thereof. Additionally, paving binders may be used as bitumen component in the present disclosure. Examples of such paving binders include, but are not limited to, resinous or polymeric materials derived from natural or synthetic origins.

The bituminous compositions of the present disclosure may be used as paving compositions for load-bearing pavement, as well as for high traffic pavements.

The bituminous paving composition of the present disclosure includes:
- (a) a high-concentration-emulsifier bitumen emulsion comprising:
  - (a.1) bitumen characterized by a penetration number of less than 220 dmm as determined according to an ASTM standard method D5 at 25° C., in an amount from about 45% to about 98% by total weight of the emulsion,
  - (a.2) an emulsifier additive in an amount from about 1% to about 20% weight based on the bitumen weight of (a.1),
  - (a.3) water in an amount to complete the emulsion;
- (b) a non-emulsified bitumen having a penetration number of less than 220 dmm as determined according to an ASTM standard method D5 at 25° C.; and
- (c) aggregate, wherein:
- (i) a combined weight amount of bitumen from the high-concentration-emulsifier bitumen of (a) and bitumen from the non-emulsified bitumen in (b) is in a range of about 1% to about 20% by total weight of the bituminous composition, and
- (ii) a weight amount of the aggregate is in a range of about 80% to about 99% by total weight of the bituminous composition.

The bituminous paving composition of the present disclosure includes:
- (a) a high-concentration-emulsifier bitumen emulsion comprising:
  - (a.1) bitumen characterized by a penetration number of less than 220 dmm as determined according to an ASTM standard method D5 at 25° C., in an amount from about 45% to about 98% by total weight of the emulsion,
  - (a.2) an emulsifier additive in an amount from about 2% to about 20% weight based on the bitumen weight of (a.1),
  - (a.3) water in an amount to complete the emulsion;
- (b) a non-emulsified bitumen having a penetration number of less than 220 dmm as determined according to an ASTM standard method D5 at 25° C.; and
- (c) aggregate, wherein:
- (i) a combined weight amount of bitumen from the high-concentration-emulsifier bitumen of (a) and bitumen from the non-emulsified bitumen in (b) is in a range of about 1% to about 20% by total weight of the bituminous composition, and
- (ii) a weight amount of the aggregate is in a range of about 80% to about 99% by total weight of the bituminous composition.

The bituminous paving composition of the present disclosure includes:
- (a) a high-concentration-emulsifier bitumen emulsion comprising:
  - (a.1) bitumen characterized by a penetration number of less than 220 dmm as determined according to an ASTM standard method D5 at 25° C., in an amount from about 45% to about 75% by total weight of the emulsion,
  - (a.2) an emulsifier additive in an amount from about 1% to about 20% weight based on the bitumen weight of (a.1),
  - (a.3) water in an amount to complete the emulsion;
- (b) a non-emulsified bitumen having a penetration number of less than 220 dmm as determined according to an ASTM standard method D5 at 25° C.; and
- (c) aggregate, wherein:
- (i) a combined weight amount of bitumen from the high-concentration-emulsifier bitumen of (a) and bitumen from the non-emulsified bitumen in (b) is in a range of about 1% to about 20% by total weight of the bituminous composition, and
- (ii) a weight amount of the aggregate is in a range of about 80% to about 99% by total weight of the bituminous composition.

In one embodiment, the bituminous paving composition includes:
- (a) a high-concentration-emulsifier bitumen emulsion comprising:
  - (a.1) bitumen characterized by a penetration number of less than 220 dmm as determined according to an ASTM standard method D5 at 25° C., in an amount from about 45% to about 75% by total weight of the emulsion,
  - (a.2) an emulsifier additive in an amount from about 1% to about 20% weight based on the bitumen weight of (a.1),
  - (a.3) water in an amount to complete the emulsion;
- (b) a non-emulsified bitumen having a penetration number of less than 220 dmm as determined according to an ASTM standard method D5 at 25° C.; and
- (c) aggregate, wherein
- (i) a weight fraction ratio of the bitumen of (a.1) to the non-emulsified bitumen of (b) is in a range of about 0.0135 to about 247.5, and
- (ii) a weight fraction ratio of a combination of the bitumen of (a.1) and the non-emulsified bitumen of (b) to the aggregate of (c) is in a range of about 0.01 to about 0.5.

The bituminous compositions of the present disclosure may further include additives. Examples of such additives include, but are not limited to, mineral additives such as lime and cement; and fibrous additives such as cellulose, glass and polymer fibers. Additionally, reclaimed asphalt pavement material may be used as additive. The additive may be introduced with the aggregate feed.

To produce the disclosed bituminous paving composition, various orders in combining the high-concentration-emulsifier bitumen emulsion, the non-emulsified bitumen, and the aggregate may be used. For example, the high-concentration-emulsifier bitumen emulsion and the non-emulsified bitumen may be mixed first, followed by an addition of the resulting mixture to the aggregate. When desired, the aggregate and the non-emulsified bitumen may be mixed first, followed by an addition of the high-concentration-emulsifier bitumen emulsion to the resulting mixture. Alternatively, the aggregate and the high-concentration-emulsifier bitumen emulsion may be mixed first, followed by an addition of the non-emulsified bitumen to the resulting mixture. Also, when appropriate the high-concentration-emulsifier bitumen emulsion and the non-emulsified bitumen may be added simultaneously to the aggregate. It is understood that one skilled in the art may manipulate the order of mixing these components to accommodate the selected mixing operation process.

In one embodiment, the disclosed bituminous paving composition is produced by a process including steps of:
(A) preparing a high-concentration-emulsifier bitumen emulsion comprising:
  (i) bitumen characterized by a penetration number of less than 220 dmm as determined according to an ASTM standard method D5 at 25° C., in an amount from about 45% to about 98% by total weight of the emulsion,
  (ii) emulsifier additive in an amount from about 1% about 20% weight based on the bitumen weight in (i), and
  (iii) water in an amount to complete the emulsion; and
(B) combining the high-concentration-emulsifier bitumen emulsion with a non-emulsified bitumen having a penetration number of less than 220 dmm as determined according to an ASTM standard method D5 at 25° C., to generate a bitumen binder component; and
(C) producing the bituminous composition having a temperature from about 50° C. to about 140° C. by mixing the bitumen binder component with preheated aggregate,
wherein:
  a combined weight amount of bitumen from the high-concentration-emulsifier bitumen of step (A) and bitumen from the non-emulsified bitumen of step (B) is in a range of about 1% to about 20% by total weight of the bituminous composition, and
  a weight amount of the aggregate is in a range of about 80% to about 99% by total weight of the bituminous composition.

In one embodiment, the disclosed bituminous paving composition is produced by a process including steps of:
(A) preparing a high-concentration-emulsifier bitumen emulsion comprising:
  (i) bitumen characterized by a penetration number of less than 220 dmm as determined according to an ASTM standard method D5 at 25° C., in an amount from about 45% to about 98% by total weight of the emulsion,
  (ii) emulsifier additive in an amount from about 1% to about 20% weight based on the bitumen weight in (i), and
  (iii) water in an amount to complete the emulsion; and
(B) combining the high-concentration-emulsifier bitumen emulsion with preheated aggregate to provide a bitumen emulsion-aggregate mixture;
(C) adding to the bitumen emulsion-aggregate mixture, a non-emulsified bitumen having a penetration number of less than 220 dmm as determined according to an ASTM standard method D5 at 25° C., to produce the bituminous composition having a temperature range of about 50° C. to about 140° C.
wherein:
  a combined weight amount of bitumen from the high-concentration-emulsifier bitumen of step (A) and bitumen from the non-emulsified bitumen of step (B) is in a range of about 1% to about 20% by total weight of the bituminous composition, and
  a weight amount of the aggregate is in a range of about 80% to about 99% by total weight of the bituminous composition.

In one embodiment, the disclosed bituminous paving composition is produced by a process including steps of:
(A) preparing a high-concentration-emulsifier bitumen emulsion comprising:
  (i) bitumen characterized by a penetration number of less than 220 dmm as determined according to an ASTM standard method D5 at 25° C., in an amount from about 45% to about 98% by total weight of the emulsion,
  (ii) emulsifier additive in an amount from about 1% to about 20% weight based on the bitumen weight in (i), and
  (iii) water in an amount to complete the emulsion; and
(B) mixing preheated aggregate with a non-emulsified bitumen having a penetration number of less than 220 dmm as determined according to an ASTM standard method D5 at 25° C., to produce a bitumen-aggregate mixture; and
(C) combining the high-concentration-emulsifier bitumen emulsion with the bitumen-aggregate mixture of step (B);
wherein:
  a combined weight amount of bitumen from the high-concentration-emulsifier bitumen of step (A) and bitumen from the non-emulsified bitumen of step (B) is in a range of about 1% to about 20% by total weight of the bituminous composition, and
  a weight amount of the aggregate is in a range of about 80% to about 99% by total weight of the bituminous composition.

In one embodiment, the disclosed bituminous paving composition is produced by a process including steps of:
(A) preparing a high-concentration-emulsifier bitumen emulsion comprising:
  (i) bitumen characterized by a penetration number of less than 220 dmm as determined according to an ASTM standard method D5 at 25° C., in an amount from about 45% to about 98% by total weight of the emulsion,
  (ii) emulsifier additive in an amount from about 1% to about 20% weight based on the bitumen weight in (i), and
  (iii) water in an amount to complete the emulsion; and
(B) providing a non-emulsified bitumen having a penetration number of less than 220 dmm as determined according to an ASTM standard method D5 at 25° C.;
(C) adding the high-concentration-emulsifier bitumen emulsion and the non-emulsified bitumen simultaneously to preheated aggregate and,
wherein:
  a combined weight amount of bitumen from the high-concentration-emulsifier bitumen of step (A) and bitumen from the non-emulsified bitumen of step (B) is in a range of about 1% to about 20% by total weight of the bituminous composition, and
  a weight amount of the aggregate is in a range of about 80% to about 99% by total weight of the bituminous composition.

When desired, the high-concentration-emulsifier bitumen emulsion of step (A) in the aforementioned methods may comprise:
  (i) bitumen characterized by a penetration number of less than 220 dmm as determined according to an ASTM standard method D5 at 25° C., in an amount from about 45% to about 98% by total weight of the emulsion, (ii) emulsifier additive in an amount from about 2% to about 20% weight based on the bitumen weight in (i), and (iii) water in an amount to complete the emulsion; and In one embodiment, the high-concentration-emulsifier bitumen emulsion of step (A) in the aforementioned methods may comprise:

(i) bitumen characterized by a penetration number of less than 220 dmm as determined according to an ASTM standard method D5 at 25° C., in an amount from about 45% to about 75% by total weight of the emulsion, (ii) emulsifier additive in an amount from about 1% to about 20% weight based on the bitumen weight in (i), and (iii) water in an amount to complete the emulsion; and In one embodiment, the bituminous paving composition produced by the aforementioned methods is characterized by:

a combined weight amount of bitumen from the high-concentration-emulsifier bitumen of step (A) and bitumen from the non-emulsified bitumen of step (B) is in a range of about 1% to about 20% by total weight of the bituminous composition, and a weight amount of the aggregate is in a range of about 80% to about 99% by total weight of the bituminous composition.

In one embodiment, the disclosed method produces the bituminous composition that is in an absence of bitumen having a penetration number of more than 220 dmm as determined according to an ASTM standard method D5 at 25° C.

In one embodiment of the disclosed method, the high-concentration-emulsifier bitumen emulsion of step (A) has a temperature range of about 25° C. to about 95° C. before combining with other components to produce the paving bituminous composition.

In one embodiment of the disclosed method, the aggregate is preheated to a temperature range of about 60° C. to about 140° C. before the combining with other components to produce the paving bituminous composition.

Bitumen

Any known bitumen met specifications of performance grade, viscosity grade, or penetration graded may be used in the present disclosure. Suitable aggregates for use in the present disclosure may have properties met specifications established by the appropriate transportation authorities as suitable for use in construction of load-bearing pavements.

The bitumen used in the present disclosure has a penetration number of less than 220 dmm, as determined according to an ASTM standard method D5 at 25° C. The bitumen with this range of penetration number is known by one skilled in the arts as "hard bitumen." Suitable bitumen for use in the present disclosure may be bitumen, modified bitumen, and combinations thereof. As used herein, the "bitumen" and "modified bitumen" are those which exhibit rheological properties that are appropriate for paving applications under specific climatic conditions, such as those which conform to the Strategic Highway Research Program (SHRP) pavement binder specifications. Furthermore, the bitumen may conform to specifications of viscosity-graded and/or penetration-graded bitumen.

Examples of bitumen suitable for use in the present disclosure include, but are not limited to, naturally occurring bitumen, bitumen derived from crude oil, petroleum pitch obtained from a cracking process, coal tar, polymer-modified bitumen, rubberized bitumen, rubberized bitumen containing recycled tire material, acid-modified bitumen, wax-modified bitumen, and combinations thereof. Additionally, paving binders may be used as bitumen component in the present disclosure. Suitable of such paving binders include, but are not limited to, resinous or polymeric materials derived from natural or synthetic origins.

Suitable bitumen for use in the present disclosure may include, but are not limited to, naturally occurring bitumen such as lake asphalt, gilsonite and gilsonite derivatives; bitumen derived from crude oil; petroleum pitches obtained from a cracking process; coal tar; and combinations thereof. Additionally, bitumen suitable for use in the present disclosure may contain recycled crumb rubber from recycled tires. It is to be understood that bitumen or bituminous may also be known as asphalt.

Suitable modified bitumen may comprise any additives known in the production of modified bitumen having properties met the performance-grade standards. These additives may include, but are not limited to, natural rubbers, synthetic rubbers, plastomers, thermoplastic resins, thermosetting resins, elastomers, and combinations thereof. Examples of these additives include, but are not limited to, styrene-butadiene-styrene (SBS), styrene-butadiene-rubber (SBR), polyisoprene, polybutylene, butadiene-styrene rubber, vinyl polymer, ethylene vinyl acetate, ethylene vinyl acetate derivative and the like.

Where desired, the modified bitumen may comprise additional additives traditionally employed in the production of bitumen emulsions to adjust the characteristics of the finished bituminous paving compositions. Such additional additives include, but are not limited to, styrene-butadiene-rubber latex; polyisoprene latex; salt; acid modifier such as polyphosphoric acid, crude tall oil, distilled tall oil acids, tall oil pitch and derivative thereof; wax modifier such as Montan wax, beeswax and Fisher-Tropsch waxes; rejuvenating agents, and combinations thereof.

Emulsifier Additive

The emulsifier additive used in the present disclosure may have an interfacial tension between the bitumen and water of less than 40 dynes/cm at a temperature of 26° C. and at an aqueous concentration of less than 0.1% weight, The emulsifier additive may include anionic surfactants, cationic surfactants, amphoteric surfactants, nonionic surfactants, and combinations thereof.

Suitable emulsifier additives for use in the present disclosure may have high-temperature shear-stability needed for mixing and subsequent compacting of the bituminous compositions, as interfacial tension between the bitumen film and aggregate so that a strong adhesive bond is maintained and water damage to the pavement is prevented.

Emulsifier additive formulations may be chosen to control dispersion properties such as interfacial viscosity, Marangoni effect, and interfacial bitumen solubility at the elevated temperature of the present disclosure (i.e., about 50° C. to about 120° C.) and concurrently at low surfactant dosages. The dosages of the emulsifier additive likewise are chosen to impart the target interfacial properties in the finished emulsion. High surfactant dosages are avoided because they are costly. Furthermore, high emulsifier additive dosages contribute to low rates of compressive strength development, and increase moisture sensitivity in the finished pavement.

Aggregate

Any aggregate used in paving materials and road construction, road rehabilitation, road repair and road maintenance derived from natural or synthetic sources may be used in the present disclosure. It is to be understood that the "aggregate" in the present disclosure also includes reclaimed asphalt pavement (RAP).

As in any construction process, aggregates are selected for asphalt paving applications based on a number of criteria, including physical properties, compatibility with the bitumen to be used in the construction process, availability and ability to provide a finished pavement that meets the performance specifications of the pavement layer for the traffic projected over the design life of the project. Among the aggregate properties that are key to successful road construction is gradation, which refers to the percent of aggregate particles of a given size. For most load-bearing asphalt pavements, three gradations are common: dense-graded, gap-graded and open-graded. Dense-graded aggregate exhibits the greatest mineral surface area per unit of aggregate. Open-graded aggregate largely consists of a single, large-sized (e.g., about 0.375 inch to about 1.0 inch) stone with very low levels (typically less than about 2% of the total aggregate) of fines (material less than 0.25 inch) or filler (mineral material less than 0.075 mm). Gap graded aggregate falls between dense-graded and open-graded classes. Reclaimed asphalt pavement (RAP) material generally reflects the gradation of the pavement from which the reclaimed material is obtained. If the original pavement is a dense-graded mix, the RAP generally will also be dense graded, although the RAP filler fraction is generally observed to be lower than the design limits of the origin aggregate specifications.

Any aggregate which is traditionally employed in the production of bituminous paving compositions is suitable for use in the present disclosure. These include, but are not limited to, dense-graded aggregate, gap-graded aggregate, open-graded aggregate, stone-matrix asphalt, reclaimed asphalt pavement, reclaimed roofing shingles and mixtures thereof. Aggregate which is not fully dried may also be employed in the present disclosure.

High-Concentration-Emulsifier Bitumen Emulsion

The disclosed bitumen emulsion may be produced at the same facility as the bituminous paving composition. The high-concentration-emulsifier emulsion may be produced using several mixing techniques. These include, but are not limited to, mixing the bitumen and water using the following types of mixing equipment: high-shear colloid mills, static in-line mixers, high-shear mixers, and high-shear nozzle devices. Furthermore, the high-concentration-emulsifier emulsion may be produced by directly injecting water into a process stream of bitumen in such that the shear generated from the water injection sufficiently disperses and mixes water droplets into the bitumen stream and provides bitumen emulsion. The high-concentration-emulsifier bitumen emulsion may be produced at a temperature range of about 80° C. to about 95° C. using such mixing process, and after production injected into the mixing chamber, where it is mixed with aggregate having a temperature range of about 60° C. to about 140° C. to yield the bituminous paving composition having a temperature range of about 60° C. to about 140° C. The high-concentration-emulsifier bitumen emulsion suitable for use in the present invention may be either oil-in-water emulsion or water-in-oil emulsion.

The bitumen emulsion of the present disclosure may be solvent-free. Environmental concerns have driven the reduction, up to elimination, of organic solvents from paving bitumen emulsions. However, for technological reasons total elimination has not been available in all paving applications prior to the availability of the present disclosure. In certain districts the term "solvent-free" is defined to include a minor portion of organic solvents. For example, "solvent-free" has at one time been defined in the state of Pennsylvania to include up to 4% organic solvents. For the purposes of this disclosure, therefore, where desired the bitumen emulsion may contain at least one solvent (such as naphtha, kerosene, diesel, flux, bio-solvents, and the like) at a level less than that needed to facilitate either: 1) the mixing of the bituminous composition at ambient temperature to yield fully-coated aggregate, or 2) the compaction of the bituminous composition at ambient temperatures. The level of solvent in the disclosed bitumen emulsion may be less than 5% by total weight of the emulsion. In one embodiment, the level of solvent in the disclosed bitumen emulsion is less than about 1% by total weight of the emulsion. As used herein, the term "ambient temperatures" means an environmental temperature of less than about 40° C.

Bituminous Paving Composition

As stated, the order of mixing for the high-concentration-emulsifier bitumen emulsion, the non-emulsified bitumen, and the aggregate may be adjusted according to the process selected for the mixing operation.

During the production of the disclosed bituminous paving composition, water in the high-concentration-emulsifier substantially evaporates during the mixing operation at such selected mixing temperature. This water level may be reduced to less than 5% by weight of the emulsion. In some embodiments, this water level may be reduced to less than 1% by weight of the emulsion.

The high emulsifier-concentration bitumen emulsion used in preparing the bituminous composition of the present disclosure has a lower content of water than the bitumen emulsion used in U.S. Patent Publication Nos. 2007/039,520 and 2008/060,551; therefore, the steam generated during mixing operation is reduced such that fouling and filtering problems may be minimized during mixing operation. Additionally, the dispersion of surfactant in the disclosed bituminous composition is superior to that in the bituminous composition of U.S. Pat. No. 7,297,204, yielding a more thoroughly coated bituminous paving composition having enhanced pavement performance properties.

The disclosed bituminous composition may be used in a pavement construction at a much lower temperatures range compared to the conventional hot-mix bituminous composition, yet it develops adhesive strength and load-bearing strength properties at rates comparable to those of hot mix bituminous paving compositions. For paving the surface, the temperature of hot-mix bituminous composition must typically exceed 143° C. On the other hand, the temperature of the disclosed bituminous composition may be lower than 120° C. for paving applications. Once applied to the surface to be paved, the disclosed bituminous composition may be compacted as desired using any of the compaction methods known in paving applications.

In one embodiment, the applied bituminous composition is compacted to an air void content comparable to that of hot mix pavement compositions made at temperatures exceeding 140° C. and having substantially equivalent aggregate gradation and bitumen content.

In one embodiment, the applied bituminous composition is compacted to develop load-bearing strength at a rate comparable to that of hot mix pavement compositions made at temperatures exceeding 140° C. and having substantially equivalent aggregate gradation and bitumen content.

The method of the present disclosure is suitable for use in thin lift overlay paving applications. Thin lift overlays are a maintenance paving technique that traditionally involve& the placement of a thin lift of a bituminous composition produced according to standard hot-mix procedures at temperatures normally exceeding 165° C. and applied at corresponding temperatures in the field to an existing, damaged pavement surface. The current thin lift technology using hot-mix bituminous compositions commonly suffers from two major deficiencies. First, the hot bituminous composition tends to cool quickly, making it difficult to extend (i.e., spread) at ambient temperatures onto the existing pavement surface needed of repair. This rapid cooling of the thin lift made of hot bituminous material can also result in relatively poor compaction. The problems that arise in construction (e.g., extension, spreading and compaction) due to rapid cooling can be aggravated when polymer-modified bitumen is used. Polymer-modified bitumen has higher viscosities than unmodified bitumen at a given temperature. Thus, hot-mix bituminous compositions (mixtures with aggregate) made with polymer-modified bitumen are more viscous than equivalent bituminous compositions made with unmodified bitumen at a given construction temperature. As a result of increased viscosity and resistance to flow, a thin lift bituminous composition made with polymer-modified bitumen exhibits even greater problems in handling and construction.

Where desired, the methods and bituminous compositions of the present disclosure may be employed in the production of bituminous paving blocks. In this technology, bituminous emulsion and aggregate are mixed to form a bituminous composition that is cast in molds, compacted, and allowed to cure. The cured blocks (or bricks) are used to construct pavements. In one embodiment, the disclosed bituminous composition is cast in the mold and compacted at a temperature range of about 50° C. to about 120° C. In another embodiment, the disclosed bituminous composition is cast in the mold and compacted at a temperature range of about 80° C. to about 100° C.

Due to the enhanced compaction (leading to higher density and higher strength) and accelerated cure rates (leading to increased production rates and improved manufacturing economics) exhibited by the bituminous compositions of the present disclosure, the methods and bituminous compositions of the present disclosure offers improvements over the construction of these blocks using traditional cold mix paving compositions.

Where desired, the bituminous compositions of the present disclosure may be produced using in-situ production process. Such in-situ operations include on-site recycling operations such as hot in-place recycling where an aged, distressed pavement may be heated with a variety of portable heater units, scarified, and re-combined with bitumen material to create a rejuvenated paving composition. The rejuvenated paving composition is extended over the width of the traffic lane and compacted to create a rejuvenate pavement riding surface.

The disclosed bituminous composition may be maintained at a temperature range of about 50° C. to about 120° C. for the period of time between the production of the bituminous compositions and their use in paving applications. It may be maintained at these temperatures in closed systems (such as relatively large stockpiles, storage silos, covered transport vehicles, and the like) to prevent evaporation of moisture.

Methods and equipment known for mixing bituminous emulsion and aggregate that are stationary or mobile may be used in the production of the disclosed bituminous paving compositions, such as pug mills of batch, drum, or continuous variety. The term "mobile" includes, but is not limited to, equipments used in-situ and in-place operations. Pug mills impart high shear to the emulsion as it is ground with coarse aggregate and/or RAP, fines, and filler. In these high shear mixers, aggregate and/or RAP (which is heated in the drum or batch mixer to the specified process temperatures) tumbles down the inclined drum while bitumen emulsion is sprayed onto the warm aggregate and/or RAP, giving emulsion-treated aggregate and/or RAP that tumbles downward through the drum mixer. The interior wall of most drum mixers is lined with vanes that repeatedly catch the mix, lift it up as the drum rotates, and deposit it back to the bottom of the drum. Drum and batch plants are capable of throughput of many hundred tons of paving material per hour.

The following example is provided to further illustrate the present disclosure and is not to be construed as limiting the disclosure in any manner.

EXAMPLE 1

The asphalt used was performance-graded asphalt, PG64-22. However, other viscosity-graded, penetration-graded, and performance-graded asphalts are also suitable for use in the present disclosure. The aggregate used was Sanders Brothers dense-graded 12.5 mm NMAS. Other dense-graded aggregate complying with Superpave aggregate qualities and performance specifications may also be used in the present disclosure.

The high emulsifier-concentration bitumen emulsion was prepared by milling in a colloid mill about 42 parts of a 4.7% active surfactant additive having a temperature of about 20-80° C. with about 58 parts of asphalt PG64-22 having a temperature of about 150° C.

About 1900 grams of dense-graded paving aggregate that was pre-heated in an oven to a temperature of 135° C., was added into a mixer. Then, about 93.4 g of virgin PG 64-22 bitumen pre-heated to a temperature of 150° C. was added to the mixer. To the dense-graded paving aggregate and the virgin PG 64-22 in the mixture was added about 10.64 gram of the aforementioned bitumen emulsion. The mixture was then agitated via a Hobart mixer for 1.0 minutes to allow for coating of the aggregate surface with bitumen binders. The coated composition was compacted at 120° C. to give a dense-graded bituminous paving composition having a total bitumen content of 5.0% w/w mix and properties similar to a conventional HMA control mix made with virgin binder and aggregate and compacted at 150° C.

The performance of the resulting bituminous composition was tested and compared to those of the two control bituminous compositions: one as disclosed in US 2007/039,520 based on water-in-oil bitumen emulsion and the other as disclosed in U.S. Pat. No. 7,297,204 based on inverted bitumen emulsion. The bituminous composition of the present disclosure which contains the high emulsifier-concentration bitumen emulsion showed superior coating of aggregates and looked blacker than both controls.

EXAMPLE 2

The high emulsifier-concentration bitumen emulsion was prepared by milling in a colloid mill about 42 parts of a 7.8% active surfactant additive having a temperature of about 20° to about 80° C. with about 58 parts of asphalt PG64-22 having a temperature of about 150° C.

About 1900 grams of dense-graded paving aggregate that was pre-heated in an oven to a temperature of 135° C., was added to a mixer. Then, about 96.3 g of virgin PG 64-22 bitumen that was pre-heated to a temperature of 150° C. was added into the mixer. To the aggregate and the virgin PG 64-22 in the mixture was added about 6.41 g of the high emulsifier-concentration bitumen emulsion, and the mixture was agitated via a Hobart mixer for 1.0 minute to allow for coating of the aggregate surface with bitumen binders. The coated composition was compacted at 120° C. to give a dense-graded bituminous paving composition having a total bitumen content of 5.0% w/w mix and properties similar to a conventional HMA control mix made with virgin binder and aggregate and compacted at 150° C.

Again, the performance of the resulting bituminous composition was tested and compared to those of the two control bituminous compositions used in EXAMPLE 1. The bituminous composition of the present disclosure, containing the high emulsifier-concentration bitumen emulsion, showed superior coating of aggregates and looked blacker than the two controls.

It is to be understood that the foregoing description relates to embodiments are exemplary and explanatory only and are not restrictive of the disclosure. Any changes and modifications may be made therein as will be apparent to those skilled in the art. Such variations are to be considered within the scope of the disclosure as defined in the following claims.

We claim:

1. A bituminous paving composition, comprising:
   (a) a high-concentration-emulsifier bitumen emulsion comprising:
      (a.1) bitumen characterized by a penetration number of less than 220 dmm as determined according to an ASTM standard method D5 at 25° C., in an amount from about 45% to about 98% by total weight of the emulsion,
      (a.2) an emulsifier additive in an amount from about 1% to about 20% weight based on the bitumen weight of (a.1),
      (a.3) water in an amount to complete the emulsion;
   (b) a non-emulsified bitumen having a penetration number of less than 220 dmm as determined according to an ASTM standard method D5 at 25° C.;
   (c) aggregate,
   wherein:
   (i) a combined weight of emulsified bitumen from the high-concentration-emulsifier bitumen emulsion of (a) and bitumen from the non-emulsified bitumen of (b) is in a range of about 1% to about 20% by total weight of the bituminous composition, and
   (ii) a weight of the aggregate is from about 80% to about 99% by total weight of the bituminous composition.

2. The composition of claim 1, wherein the high-concentration-emulsifier bitumen emulsion comprises:
   (a.1) bitumen characterized by a penetration number of less than 220 dmm as determined according to an ASTM standard method D5 at 25° C., in an amount from about 45% to about 98% by total weight of the emulsion,
   (a.2) an emulsifier additive in an amount from about 2% to about 20% weight based on the bitumen weight of (a.1),
   (a.3) water in an amount to complete the emulsion.

3. The composition of claim 1, wherein the high-concentration-emulsifier bitumen emulsion comprises:
   (a.1) bitumen characterized by a penetration number of less than 220 dmm as determined according to an ASTM standard method D5 at 25° C., in an amount from about 45% to about 75% by total weight of the emulsion,
   (a.2) an emulsifier additive in an amount from about 1% to about 20% weight based on the bitumen weight of (a.1).
   (a.3) water in an amount to complete the emulsion.

4. The composition of claim 3, wherein:
   (1) a weight fraction ratio of the emulsified bitumen from the high-concentration-emulsifier bitumen emulsion of (a) to bitumen from the non-emulsified bitumen of (b) is in a range of about 0.0135 to about 247.5, and
   (2) a weight fraction ratio of a combination of both the emulsified bitumen emulsion of (a.1) and the non-emulsified bitumen of (b) to the aggregate of (c) is in a range of about 0.01 to about 0.5.

5. The composition of claim 1, further characterized by an absence of any bitumen having a penetration number of more than 220 dmm, as determined according to an ASTM standard method D5 at 25° C.

6. The composition of claim 1, wherein the bitumen of (a.1), (b), or combinations therefore comprises a member selected from the group consisting of naturally occurring bitumen, bitumen derived from crude oil, petroleum pitch obtained from a cracking process, coal tar, polymer-modified bitumen, rubberized bitumen, rubberized bitumen containing recycled tire material, acid-modified bitumen, wax-modified bitumen, resinous or polymeric materials derived from natural origins, resinous or polymeric materials derived from synthetic origins, and combinations thereof.

7. The composition of claim 1, wherein the emulsifier additive has an interfacial tension between the bitumen and water of less than 40 dynes/cm at a temperature of 26° C. and at an aqueous concentration of less than 0.1% weight.

8. The composition of claim 1, wherein the emulsifier additive comprises a surfactant selected from the group consisting of cationic surfactant, anionic surfactant, amphoteric surfactant, non-ionic surfactant, and combinations thereof.

9. The composition of claim 1, wherein the aggregate comprises a member selected from the group consisting of dense-graded aggregate, gap-graded aggregate, open-graded, stone-matrix aggregate, reclaimed asphalt paving material, reclaimed roofing shingles, and combinations thereof.

10. The composition of claim 1, characterized by a temperature of lower than about 120° C. when being applied onto a surface to be paved.

11. A paved road including a layer of the bituminous composition of claim 1.

12. A method of producing bituminous paving composition, including steps of:
   (A) preparing a high-concentration-emulsifier bitumen emulsion comprising:
      (i) bitumen characterized by a penetration number of less than 220 dmm as determined according to an ASTM standard method D5 at 25° C., in an amount from about 45% to about 98% by total weight of the emulsion,
      (ii) emulsifier additive in an amount from about 1% to about 20% weight based on the bitumen weight in (i), and
      (iii) water in an amount to complete the emulsion;
   (B) providing a non-emulsified bitumen having a penetration number of less than 220 dmm as determined according to an ASTM standard method D5 at 25° C.;
   (C) providing preheated aggregate;
   (D) combining the high-concentration-emulsifier bitumen emulsion, the non-emulsified bitumen, and the preheated aggregate to produce the bituminous composition having a temperature range of about 50° C. to about 140° C.;
   wherein:
   a combined weight amount of bitumen from the high-concentration-emulsifier bitumen emulsion of step (A) and bitumen from the non-emulsified bitumen of step (B) is in a range of about 1% to about 20% by total weight of the bituminous composition, and
   a weight amount of the aggregate is in a range of about 80% to about 99% by total weight of the bituminous composition.

13. The method of claim 12, wherein the high-concentration-emulsifier bitumen emulsion is combined with the non-emulsified bitumen prior to an addition of the preheated aggregate.

14. The method of claim 12, wherein the high-concentration-emulsifier bitumen emulsion is combined with the preheated aggregate prior to an addition of the non-emulsified bitumen.

15. The method of claim 12, wherein the non-emulsified bitumen is combined with the preheated aggregate prior to an addition of the high-concentration-emulsifier bitumen emulsion.

16. The method of claim 12, wherein the high-concentration-emulsifier bitumen emulsion and the non-emulsified bitumen are added simultaneously to the preheated aggregate.

17. The method of claim 12, wherein the high-concentration-emulsifier bitumen emulsion comprises:
(i) bitumen characterized by a penetration number of less than 220 dmm as determined according to an ASTM standard method D5 at 25° C., in an amount from about 45% to about 98% by total weight of the emulsion,
(ii) an emulsifier additive in an amount from about 2% to about 20% weight based on the bitumen weight of (i), and
(iii) water in an amount to complete the emulsion.

18. The method of claim 12, wherein the high-concentration-emulsifier bitumen emulsion comprises:
(i) bitumen characterized by a penetration number of less than 220 dmm as determined according to an ASTM standard method D5 at 25° C., in an amount from about 45% to about 75% by total weight of the emulsion,
(ii) an emulsifier additive in an amount from about 1% to about 20% weight based on the bitumen weight of (i), and
(iii) water in an amount to complete the emulsion.

19. The method of claim 18, wherein:
a weight fraction ratio of the emulsified bitumen from the high-concentration-emulsifier bitumen emulsion of step (A) to bitumen from the non-emulsified bitumen of (B) is in a range of about 0.0135 to about 247.5, and
a weight fraction ratio of a combination of the bitumen of step (A)(i) and the non-emulsified bitumen of step (B) to the aggregate of step (C) is in a range of about 0.01 to about 0.5.

20. The method of claim 12, wherein the produced bituminous composition is absence of any bitumen having a penetration number of more than 220 dmm, as determined according to an ASTM standard method D5 at 25° C.

21. The method of claim 12, wherein the high-concentration-emulsifier bitumen emulsion is prepared using high-shear mixing process comprising a member selected from the group consisting of high-shear colloid mill dispersion, high-shear static mixer dispersion, high-shear roto-mixer dispersion, high-shear dispersion via injection of water into a bitumen process stream through phase inversion process, and combinations thereof.

22. The method of claim 12, wherein the high-concentration-emulsifier bitumen emulsion is delivered after production directly into at least one stationary or mobile asphalt mixing unit, wherein the mixing unit comprises a member selected from the group consisting of drum mixers, pug-mill batch mixers, dual mixers, and combinations thereof, and wherein the mobile mixing unit comprises equipment used in in-situ or in-place operations.

23. The method of claim 12, wherein the high-concentration-emulsifier bitumen emulsion of step (A) has a temperature range of about 25° C. to about 95° C. before the combining step (D) to produce the bituminous composition.

24. The method of claim 12, wherein the aggregate of step (C) is preheated to a temperature range of about 60° C. to about 140° C. before the combining step (D) to produce the bituminous composition.

25. The method of claim 12, wherein the bitumen of (A)(1), (B), or combinations therefore comprises a member selected from the group consisting of naturally occurring bitumen, bitumen derived from crude oil, petroleum pitch obtained from a cracking process, coal tar, polymer-modified bitumen, rubberized bitumen, rubberized bitumen containing recycled tire material, acid-modified bitumen, wax-modified bitumen, resinous or polymeric materials derived from natural origins, resinous or polymeric materials derived from synthetic origins, and combinations thereof.

26. The method of claim 12, wherein the emulsifier additive has an interfacial tension between the bitumen and water of less than 40 dynes/cm at a temperature of 26° C. and at an aqueous concentration of less than 0.1% weight.

27. The method of claim 12, wherein the emulsifier additive comprises a surfactant selected from the group consisting of cationic surfactant, anionic surfactant, amphoteric surfactant, non-ionic surfactant, and combinations thereof.

28. The method of claim 12, wherein the aggregate comprises a member selected from the group consisting of dense-graded aggregate, gap-graded aggregate, open-graded, stone-matrix aggregate, reclaimed asphalt paving material, reclaimed roofing shingles, and combinations thereof.

* * * * *